United States Patent [19]

Nuttens et al.

[11] Patent Number: 4,820,876

[45] Date of Patent: Apr. 11, 1989

[54] POLYETHYLENE WAX

[75] Inventors: Hugo J. C. Nuttens, Schoten; Gerard Van Haeren, Rixensart, both of Belgium

[73] Assignee: Exxon Research & Engineering Co., Florham Park, N.J.

[21] Appl. No.: 54,636

[22] Filed: May 27, 1987

Related U.S. Application Data

[62] Division of Ser. No. 691,951, Jan. 15, 1985.

[30] Foreign Application Priority Data

Jan. 20, 1984 [GB] United Kingdom ................. 8401567

[51] Int. Cl.$^4$ .............................................. C07C 47/20
[52] U.S. Cl. .................................... 568/494; 524/275; 568/458; 568/459; 568/460; 585/3; 585/9; 585/510; 585/520; 585/732
[58] Field of Search ...................... 585/3, 9, 520, 732, 585/510; 568/458–460, 494; 524/275

[56] References Cited

U.S. PATENT DOCUMENTS

| | | | |
|---|---|---|---|
| 3,997,624 | 12/1976 | Hudgin | 526/348 |
| 4,012,547 | 3/1977 | Smedberg | 524/487 |
| 4,039,560 | 8/1977 | Tomoshige | 525/383 |
| 4,127,619 | 11/1978 | Godfrey | 524/481 |
| 4,146,521 | 3/1979 | Godfrey | 524/489 |
| 4,246,150 | 1/1981 | Bower | 524/278 |
| 4,304,698 | 12/1981 | Tachi et al. | 524/114 |
| 4,471,086 | 9/1984 | Foster | 524/487 |
| 4,567,223 | 1/1986 | Ames | 524/489 |

FOREIGN PATENT DOCUMENTS 2034534 1/1972 Fed. Rep. of Germany .

*Primary Examiner*—Herbert J. Lilling
*Attorney, Agent, or Firm*—J. F. Hunt

[57] ABSTRACT

Synthetic polyethylene wax having low molecular weight of 250 to 3000 and a density of 0.930 to 0.950 is prepared in a high pressure process at pressures of at least 800 bar using a carbonyl compound such as acetaldehyde as chain transfer agent. The resulting wax with incorporated CO has good compatibility in hot melt systems, and may be stripped to remove light ends, increase density and crystallinity and improve thermal stability.

8 Claims, No Drawings

POLYETHYLENE WAX

This is a division of application Ser. No. 691,951 filed 1/15/85.

This invention relates to synthetic polyethylene wax, and to a high pressure polymerization process for preparing the wax.

Hydrocarbon waxes are widely used in a variety of applications such as in printing inks, processing aids, mould release agents, candles, polishes and particularly in coatings and adhesives. An important application is in hot melt systems, particularly hot melt coatings and hot melt adhesives. In general, paraffin waxes or microcrystalline waxes are used in such hot melt applications, but paraffin waxes and soft microcrystalline waxes both suffer from low melting points. Hard microcrystalline waxes have higher melting points but are expensive and have high viscosity. In some systems they also give rise to incompatibility problems.

Various synthetic techniques are also used for preparing waxes. The well-known Fischer-Tropsch process produces waxy products, but these materials tend to have a higher molecular weight "tail" than paraffin waxes which affects their properties. Waxes are also prepared by degradation of higher molecular weight polyethylenes to obtain waxes with the desired molecular weight. However, the products of such a degradation are expensive to produce. A further possibility is to prepare waxes directly by polymerization of ethylene or propylene. Atactic polypropylene waxes tend to be sticky which results in handling difficulties, and in some systems these waxes are incompatible. Polyethylene waxes have in the past tended to be of higher molecular weight and thus higher viscosity than is required for many applications.

This invention is particularly concerned with polyethylene waxes produced by a high pressure polymerization process. GB Pat. No. 1 329 215 describes a process for preparing ethylene telomer waxes with a viscosity of 25 to 1500 mPas at 140° C., a molecular weight of 1000 to 5000 and a Ring and Ball softening point of 70° to 118° C. by reacting ethylene and a telogen (such as an alcohol, ether, ketone, ester, acid or other derivative such as acetaldehyde at elevated pressures of 3000 to 11000 psi (20.7 to 75.9 MNm$^{-2}$) and temperatures of 140° to 240° C. The reaction is conducted so that very high conversions of 55 to 75% are obtained. Large amounts of telogen are required and specific initiators are employed.

GB Pat. No. 1 058 967 describes the production of a soft, pasty polyethylene wax by a high pressure process employing hydrogen and at least one other chain transfer agent at a pressure above 500 bar and a temperature of 100° to 300° C. DL 52218, DL65663, NL 68-00783, DL124188, DL124187, DL132589 and DL137444 describe similar processes employing hydrogen as chain transfer agent.

U.S. Pat. No. 3,835,107 describes a high pressure process for the polymerization of ethylene at 50° to 350° C. and 100 to 400 bar using a specific mixture of peroxide and oxygen as inititator. The use of polymerization regulators is disclosed, and hydrogen and alkanes are exemplified. The examples show the product to be of high molecular weight (greater than 5000).

DE 1303352 describes the polymerization of ethylene at 240° C. to 270° C. and 800 to 1000 bar in the presence of specific initiator to give high molecular weight products (average molecular weight of 3000-6000).

SU Pat. No. 508511 describes the use of a propylene oligomer as a chain transfer agent in the polymerization of ethylene to give waxes.

This invention provides a new process for the preparation of low molecular polyethylene waxes by a high pressure process, and new polyethylene waxes thus produced.

In one aspect this invention provides a process for the preparation of a polyethylene wax having a number average molecular weight ($\overline{Mn}$) as measured by gel permeation chromatography of from 250 to 3000 and a density of 0.930 to 0.950, in which process ethylene is polymerized at a pressure of at least 800 bar, at a temperature of from 150° to 270° C., in the substantial absence of solvent and in the presence of a carbonyl compound as chain transfer agent to give the desired wax product.

It has been found that using a carbonyl compound such as an aldehyde or ketone and specifically acetaldehyde under the high pressure conditions of the invention the low molecular weight product may be obtained. Furthermore, the incorporation of carbonyl groups into the product is believed to provide the additional benefit of improved compatibility with resins in hot melt systems. The amount of carbonyl compound to be employed will be dependent of the reactor conditions and the particular wax which it is desired to produce. It is possible to determine this empirically. However, in general the amount of acetaldehyde employed will be from 5 to 15 wt.% of the weight of the feed to the reactor.

In the process of the invention the pressure in the polymerization reactor is preferably at least 1000 bar, more preferably at least 1200 bar, and typically in the range of 1200 to 3000 bar, most preferably from 1500 to 2500 bar. The temperature of the reactor preferably in the range of 150° to 225° C. The residence time in the reactor is typically from 20 to 120 seconds, and preferably at least 30 seconds.

The polymerization is initiated by free radical system, and the choice of suitable free radical initiator is believed to be within the competence of one skilled in the art. Among suitable initiators which may be used are peresters such as t-butylperpivalate and t-butyl-perbenzoate.

Mixtures of two or more initiators may be used. Typically the concentration used is up to 500 ppm by weight of the reactor feed. The initiator is preferably added in a hydrocarbon solvent such as hexane, octane or isododecane. The term "in the substantial absence of solvent" used herein in relation to the process of invention is not intended to exclude such minor amounts of solvents for initiator dilution, but to indicate that no solvent is required for the polymerization itself.

The conversion rate of the process of the invention is typically in the region of 5 to 20%, this being expressed as a weight percentage calculated as the production rate of polymer divided by the sum of the production rate of polymer plus the rate of unreacted ethylene-acetaldehyde mixture leaving the reactor and multiplied by 100.

The wax produced by the process of the invention has low molecular weight, but good compatibility, and certain of the waxes which may be produced by the process of the invention are new and show significant advantages over prior art waxes.

It has further been discovered that the products prepared by the process of the invention may be enhanced, in particular their thermal stability may be improved by treatment of the polyethylene wax to remove at least a part of the light end of the wax containing up to 34 carbon atoms. Preferably substantially all of the light end of the wax containing up to 24 carbon atoms is removed. This may be achieved in a variety of ways, for example, by use of a stripping operation employing reduced pressure and/or heating.

In the stripping step typically from 5 to 20 wt%, more usually 8 to 10 wt%, of the product of the polymerization may be removed.

The stripping step improves the properties of the polyethylene wax, including giving:
higher crystallinity (i.e. higher enthalpy of fusion)
higher density—giving densities of up to 0.960
higher hardness
higher flash point
higher ring and ball softening point
higher melt peak temperature
higher melt viscosity Thus in a further aspect this invention provides a polyethylene wax having $\bar{M}n$ of 250 to 650, a ratio of $\bar{M}w$ to $\bar{M}n$ of less than 3 (where $\bar{M}w$ is the weight average molecular weight measured by gel permeation chromatography) and a density of 0.930 to 0.945.

The invention also provides waxes having $\bar{M}n$ of from 250 to 3000, a density of from 0.930 to 0.960 and a degree of CO incorporation of from 0.2 to 12 weight % CO measured by elemental analysis for oxygen. Based on IR investigations, it is concluded that most of the oxygen is incorporated into CO groups. The CO content is preferably 0.2 to 10 wt% CO, more preferably from 1 to 8 wt% CO, most preferably from 2 to 6 wt%.

The wax of the invention preferably has a viscosity of 10 to 100 mPa.s measured at 121° C., more preferably from 15 to 50 mPa.s. The melt peak temperature (MPT) as measured by differential scanning calorimetry is preferably greater than 95° C., more preferably greater than 100° C. The wax was heated to 160° C. then allowed to solidify by cooling at 10° C./min and the measurement taken on reheating at 10° C./min.

The hardness of the wax (Shore hardness A after 15 seconds) is preferably greater than 30, more preferably greater than 50.

As already indicated hydrocarbon waxes have a variety of applications, and the waxes of the invention are believed to be useful in all these applications. They have particular utility in hot melt systems where their properties and particularly their compatibility is beneficial. In hot melt systems there are a number of properties in the system which it is desirable to optimize. In general, it is important for hot melt systems to be compatible, stable and to resist skinning, while in hot melt adhesives there are additional requirements for long open time, short setting time and good adhesion. Hot melt coating desirably have good hardness and scuff resistance. Hot melt systems typically comprise a tackifier, an EVA and a wax, and each of these components will be chosen in an attempt to optimise the above properties although inevitably there will be an element of compromise in the selection of the components. The wax of the invention is especially suitable for use in hot melt system as it has shown good compatibility with at least comparable or acceptable performance in the other aspects. Thus, the invention extends to the use of the wax in hot melt systems and to hot melt systems containing the wax. The wax may be used to replace prior art waxes in otherwise conventional hot melt systems, and particularly in compositions for hot melt adhesives and hot melt coatings.

The following Examples are now given, though only by way of illustration, to show certain aspects of the invention in more detail.

EXAMPLE 1

A mixture containing 15 wt.% acetaldehyde, 1200 ppm t-butylperpivalate (TBPPI), the balance being ethylene, was polymerized in an autoclave reactor at 1900 bar pressure and 205° C. temperature. The residence time was 40 sec., the rate of conversion was 11.9%. The product obtained had a molecular weight of 650 (measured by vapor phase osmometry VPO), the density was 0.934 and the melt peak temperature (measured by differential scanning calorimetry) was 103° C.

EXAMPLE 2

The procedure of Example 1 was repeated but with the reactor temperature at 245° C. and 800 ppm of t-butylperbenzoate (TBPB). The conversion was 18.6%. The VPO molecular weight of the product was 1030, the density was 0.928 and the melting peak temperature was 110° C.

EXAMPLE 3

The procedure of Example 1 was repeated but with the reactor temperature at 265° C. and 800 ppm of TBPB. The conversion was 22.6%. The VPO molecular weight of the product was 1070, density was 0.921, and the melt peak temperature was 101° C.

EXAMPLE 4

The procedure of Example 1 was repeated with the reactor temperature at 210° C., 1200 ppm TBPPI and an acetaldehyde concentration of 5 wt.%. The conversion was 14.5%. The VPO molecular weight of the product was 2100, the density was 0.940 and the melt peak temperature was 116° C.

EXAMPLE 5

A large scale test of the process of the invention was carried out on a full-scale autoclave. The reactor feed comprised from 7 to 15 wt.% acetaldehyde, 200 to 500 ppm TBPPI, the balance being ethylene. The autoclave was operated at 1900 bar and 205° C., and the acetaldehyde concentration was varied. The temperature was then lowered first to 190° C. and then to 173° C. Samples were taken at regular intervals for analysis. The results are shown in Table 1.

These Examples show that the process of the invention provides an effective low cost means of preparing a range of low molecular weight synthetic waxes.

TABLE 1

| Sample | Pressure kg/cm$^2$ | Temp °C. | Feed Gas Temp °C. | Conversion % | Melt Visc mPas at 121° C. | Density | DSC Melt Peak °C. | CO (wt %)$^2$ | $\bar{M}n$ | $\bar{M}w$ | $\bar{M}w/\bar{M}n$ | Shore hardness A-15 sec |
|---|---|---|---|---|---|---|---|---|---|---|---|---|
| A | 1900 | 205 | 115 | 7 | 5350 | 0.9338 | | | 1910 | 14800 | 7.7 | — |
| B | 1900 | 205 | | — | 1025 | 0.939 | | 0.8 | 1330 | 5430 | 4.9 | |

TABLE 1-continued

| Sample | Pressure kg/cm$^2$ | Temp °C. | Feed Gas Temp °C. | Conversion % | Melt Visc mPas at 121° C. | Density | DSC Melt Peak °C. | CO (wt %)[2] | Molecular weight[1] $\overline{Mn}$ | $\overline{Mw}$ | $\overline{Mw}/\overline{Mn}$ | Shore hardness A-15 sec |
|---|---|---|---|---|---|---|---|---|---|---|---|---|
| C | 1900 | 205 | 95 | 8.5 | 705 | 0.9403 | | | 1080 | 3970 | 3.7 | — |
| D | 1900 | 205 | 100 | 8 | 137 | 0.9419 | | | 370 | 1360 | 3.7 | — |
| E | 1900 | 205 | | — | 27.5 | 0.9405 | | | 380 | 780 | 2.1 | |
| F | 1900 | 205 | 77 | 10 | 21.5 | 0.9352 | | | 400 | 830 | 2.1 | — |
| G | 1900 | 205 | 78 | 10 | 19.1 | 0.9379 | 105 | | 350 | 740 | 2.1 | 70 |
| H | 1900 | 205 | 79 | 10 | 13.9 | 0.9341 | 101 | | 300 | 600 | 2 | 53 |
| I | 1900 | 205 | 78 | 10 | 11.2 | 0.9294 | 98 | 4.1 | 270 | 500 | 1.9 | 23 |
| J | 1900 | 205 | 36 | 13 | 20.6 | 0.9395 | 107 | 3.1 | 380 | 850 | 2.3 | 71 |
| K | 1900 | 190 | 79 | 8.5 | 10.7 | 0.9294 | 98.5 | 5.2 | 261 | 473 | 1.8 | 24 |
| L | 1900 | 173 | 81 | 7 | 12.6 | 0.9381 | 104 | | 276 | 553 | 2 | 42 |
| M | 1900 | 173 | 82 | 7 | 14.4 | 0.9399 | 104 | | 301 | 615 | 2 | 63 |
| N | 1900 | 173 | 82 | 7 | 18 | 0.9440 | 107.5 | 3.6 | 350 | 773 | 2.2 | 74 |

Note:
[1]Molecular weight measured by gel permeation chromatography.
[2]Measured by elemental oxygen analysis, assuming all oxygen incorporated as CO.

Samples E,F,G,H,J,L,M and N are examples of the novel waxes of the invention. Samples J and N were tested for their suitability for use in hot melt system in the following tests, presented by way of illustration only. In these tests the performance of these samples is compared to sample K and to certain prior art waxes.

Test 1: Cloud Point Temperature

Test composition were made up using the following proportions:

| | wt. % |
|---|---|
| ethylene vinyl acetate copolymer (EVA) | 33 |
| Wax | 33 |
| Resin | 33 | and tested for their cloud point temperature which is the temperature at which the first indication of cloud or haze appeared when the composition was allowed to be cooled in air from 200° C. This is a measure of compatibility; the lower the cloud point the more compatible the composition. A variety of EVA and resin components were compared for a range of waxes. The results are shown in Table 2 below.

The EVAs are:
I=melt index 150, VA content 19%
II=melt index 25, VA content 28%
III=melt index 55, VA content 40%
The resins are:
1=Escorez 1310, available from Exxon Chemical Co.
2=Escorez 2101,
3=Staybelite Ester 10, a hydrogenated rosin ester available from Hercules.

The results show that the products of the process of the invention have excellent compatability with a range of EVAs and resins.

Test 2: Adhesion

A T-peel test was carried out according to the procedure of ASTM D 1876 on a series of compositions comprising:

| | % |
|---|---|
| EVA II | 33 |
| Resin | 33 |
| Wax | 33 |
| Irganox 1076 | 0.5 |

TABLE 2

| | EVA | | | | | | | | |
|---|---|---|---|---|---|---|---|---|---|
| | I | II | III | I | II | III | I | II | III |
| | | | | | Resin: | | | | |
| Wax | 1 | 1 | 1 | 2 | 2 | 2 | 3 | 3 | 3 |
| K | 95 | 94 | 98 | 98 | 96 | 102 | 94 | 95 | 97 |
| N | 102 | 94 | 99 | 98 | 96 | 97 | 108 | 102 | 110 |
| J | 100 | 99 | 101 | 96 | 98 | 103 | 105 | 102 | 105 |
| SASOL H-1[1] | 99 | 95 | 104 | 103 | 103 | 106 | 98 | 103 | 140 |
| Polywax 1000[2] | 102 | 102 | 102 | 106 | 112 | 107 | 97 | 112 | 135 |
| Multiwax 180 MH[3] | 97 | 97 | 100 | 102 | 102 | 106 | 103 | 105 | 115 |

Notes:
[1]Sasol H-1 is a Fischer-Tropsch wax available from Sasol.
[2]Polywax 1000 is a hard microcrystalline wax available from the Bareco Division of Petrolite Corporation
[3]Multiwax 180 MH is a microcrystalline wax available from Witco Corporation The results are shown in Tables 3 and 4 expressed in units of gm cm$^{-1}$ for T-peel adhesion on polyethylene (PE) and aluminium (Al).

The results show that the new wax of the invention give comparable adhesion to the prior art waxes, which in conjunction with their improved compatibility gives them a better balance of properties in hot melt systems.

Test 3: Cold Flexibility

Using the same compositions as in Test 2, the cold flexibility was measured by the following procedure.

A sheet of hot melt adhesive was formed by pressing the adhesive using a 1 mm spacer to obtain a uniform sheet. Samples of 5 mm width were cut from this sheet, and were placed in a cold flex tester for 3 hours at 0° C. In the test the samples were bent around a 30 mm diameter cylinder and observed for cracking. The test was then repeated at temperatures lowered in steps of 2.5° C. The temperature of cracking was recorded and the average cracking temperature of five specimens of the adhesive was taken as the cold flexibility temperature.

The results are shown in Table 5 which show an advantage for the products of the process of the invention.

TABLE 3

| Resin 1 Adhesion (gm/cm) | K | N | J | SASOL H-1 | POLYWAX 1000 | MULTIWAX 180 |
|---|---|---|---|---|---|---|
| PE | 5 | 25 | 18 | 20 | 25 | 15 |
| Al | 50 | 115 | 85 | 110 | 130 | 100 |

TABLE 4

| Resin 2 Adhesion (gm/cm) | K | N | J | SASOL H-1 | POLY-WAX 1000 | MULTIWAX 180 |
|---|---|---|---|---|---|---|
| PE | 1180 | 1300 | 1340 | 1420 | 1380 | 1320 |
| Al | 550 | 770 | 730 | 715 | 800 | 720 |

TABLE 5

| Cold Flexibility (°C.) | K | N | J | SASOL H-1 | MULTIWAX 180 M-H |
|---|---|---|---|---|---|
| Resin 1 | −17.5 | −17.5 | −17.5 | −15 | −15 |
| Resin 2 | −17.5 | −17.5 | −17.5 | −17.5 | −15 |

Test 4: Stripping

Stripping was carried out on waxes J and N using a thin film evaporator operating at 100–500 Pa (1–5 m bar) pressure and a wall temperature of 300° to 320° C. with the wax being subjected to a temperature of 250° C. To achieve the desired level of thermal stability the stripping is continued until from 10–11 wt% of the initial wax is removed. Table 6 below compares the properties of the unstripped and stripped forms of the waxes.

The hot melt properties of the stripped waxes are compared with the unstripped forms and conventional waxes in the same experiments as conducted in Tests 1, 2 and 3. The hot melt adhesive composition tested in each case was:

| EVA (melt index 400, VA content 28%) | 33 wt % |
|---|---|
| Resin 2 | 33 wt % |
| Wax under test | 33 wt % |
| Stabilizer (Irganox 1076) | 0.5 wt % |

The results obtained are shown in Table 7 below.

This test shows that the stripped form of the wax has improved thermal stability while retaining excellent performance in hot melt adhesives.

TABLE 6
EFFECT OF STRIPPING ON WAX PROPERTIES

| | Wax | | | |
|---|---|---|---|---|
| | N | N Stripped | J | J Stripped |
| Molecular Weight Mn (GPC) | 350 | 675 | 380 | 720 |
| Density at 23° C. (gm/cm³) | 0.944 | 0.954 | 0.939 | 0.947 |
| Soft Point (°C.) Ring and ball | 110 | 113 | 109 | 112 |
| Melt Peak Temper (D.S.C.) (°C.) | 108 | 111 | 107 | 110 |
| Hardness Shore A 20° C. - 15 sec | 68 | 90+ | 75 | 90+ |
| Melt Visco at 121° C. (mPa.s) | 17 | 25 | 20 | 26 |
| Flash Point (C.O.C.) (°C.) | 228 | 305 | 238 | 306 |
| Fusion Enthalpy ΔHf· cal/gm | 29 | 46 | 25 | 43 |

TABLE 7
HOT MELT PROPERTIES OF PE WAX

| EVA UL 40028 | 33 wt % |
|---|---|
| Escorez 2101 | 33 wt % |
| Wax | 33 wt % |
| Stabilizer | 0.5 wt % |

| Wax | Cloud Point °C. | T-Peel (N/cm) PE | Kraft Paper | Al | Cold Flexibility (°C.) | Fail Temperature (°C.) Shear PE | Al | Peel PE | Al |
|---|---|---|---|---|---|---|---|---|---|
| N | 99 | 9–10 | Paper Tear | N.A. | −10 | — | — | — | — |
| N stripped | 103 | 9–12 | Paper Tear | 7–9 | −7.5 | 53 | 67 | 47 | 60 |
| J | 100 | 8–12 | Paper Tear | 6 | −10 | 53 | 58 | 49 | 53 |
| J stripped | 102 | 10–12 | Paper Tear | 7 | −7.5 | 56 | 69 | 50 | 56 |
| Sasol H-1 | 102 | 9–11.5 | Paper Tear | 7 | −5 | 56 | 73 | 50 | 60 |
| Polywax 1000 | 107 | 10 | N.A. | N.A. | −5 | — | — | — | — |
| Multiwax 180 MH | 89 | 10–11 | N.A. | 6.5 | −7.5 | — | — | — | — |

We claim:

1. A polyethylene wax having mn of 250 to 3,000 as measured by gel permeation chromatography, a density of 0.930 to 0.960, a viscosity of 10 to 100 mPa.s measured at 121 degrees C. and a degree of CO incorporation of 0.2 to 12 wt.% CO as measured by elemental analysis of oxygen.

2. A polyethylene wax as claimed in claim 1, having a degree of CO incorporation of 0.2 to 10 wt.% CO.

3. A polyethylene wax as claimed in claim 2 having a degree of CO incorporation of 2 to 6 wt% CO.

4. A wax as claimed in claim 1, which has a viscosity of 15 to 50 mPa.s.

5. A wax of claim 1, which has a melt peak temperature (MPT) as measured by differential scanning calorimetry greater than 95° C.

6. A wax as claimed in claim 5, which as a MPT of greater than 100° C.

7. A wax of claim 5, which has a Shore hardness A after 15 seconds greater than 30.

8. A wax as claimed in claim 7, which has a Shore hardness A greater than 50.

* * * * *